United States Patent

Shields

[15] 3,646,852
[45] Mar. 7, 1972

[54] DETENT MECHANISM FOR RACK AND PINION POWER STEERING

[72] Inventor: Martin A. Shields, South Bend, Ind.

[73] Assignee: The Bendix Corporation

[22] Filed: Aug. 17, 1970

[21] Appl. No.: 64,537

[52] U.S. Cl.....................................91/467, 92/51, 92/136
[51] Int. Cl....................F15b 11/08, F15b 13/04, F01b 7/20
[58] Field of Search................91/467, 245, 462; 92/139, 23, 92/259, 176, 51; 180/79.2

[56] References Cited

UNITED STATES PATENTS

| 2,449,516 | 9/1948 | Shakespeare et al. | 92/23 |
| 3,037,485 | 6/1962 | Adams | 92/136 |
| 3,050,943 | 8/1962 | Thorel et al. | 92/23 |
| 3,312,148 | 4/1967 | Adams | 92/136 |

*Primary Examiner*—Paul E. Maslousky
*Attorney*—Ken C. Decker and Plante, Hartz, Smith & Thompson

[57] ABSTRACT

A rack and pinion power-steering unit is disclosed which includes a detent mechanism that couples the sleeve used in units of this type to the rack when the vehicle wheels are turned in one direction, but permits relative movement between the rack and the sleeve when the vehicle wheels are turned in the opposite direction. The detent includes a spherical force transmitting element which is normally carried in a recess in the housing, but which is urged into a position interconnecting the sleeve and the rack when the wheels of the vehicle are turned in the one direction. When the vehicle wheels are turned in the opposite direction, the force-transmitting element couples the sleeve to the housing.

9 Claims, 2 Drawing Figures

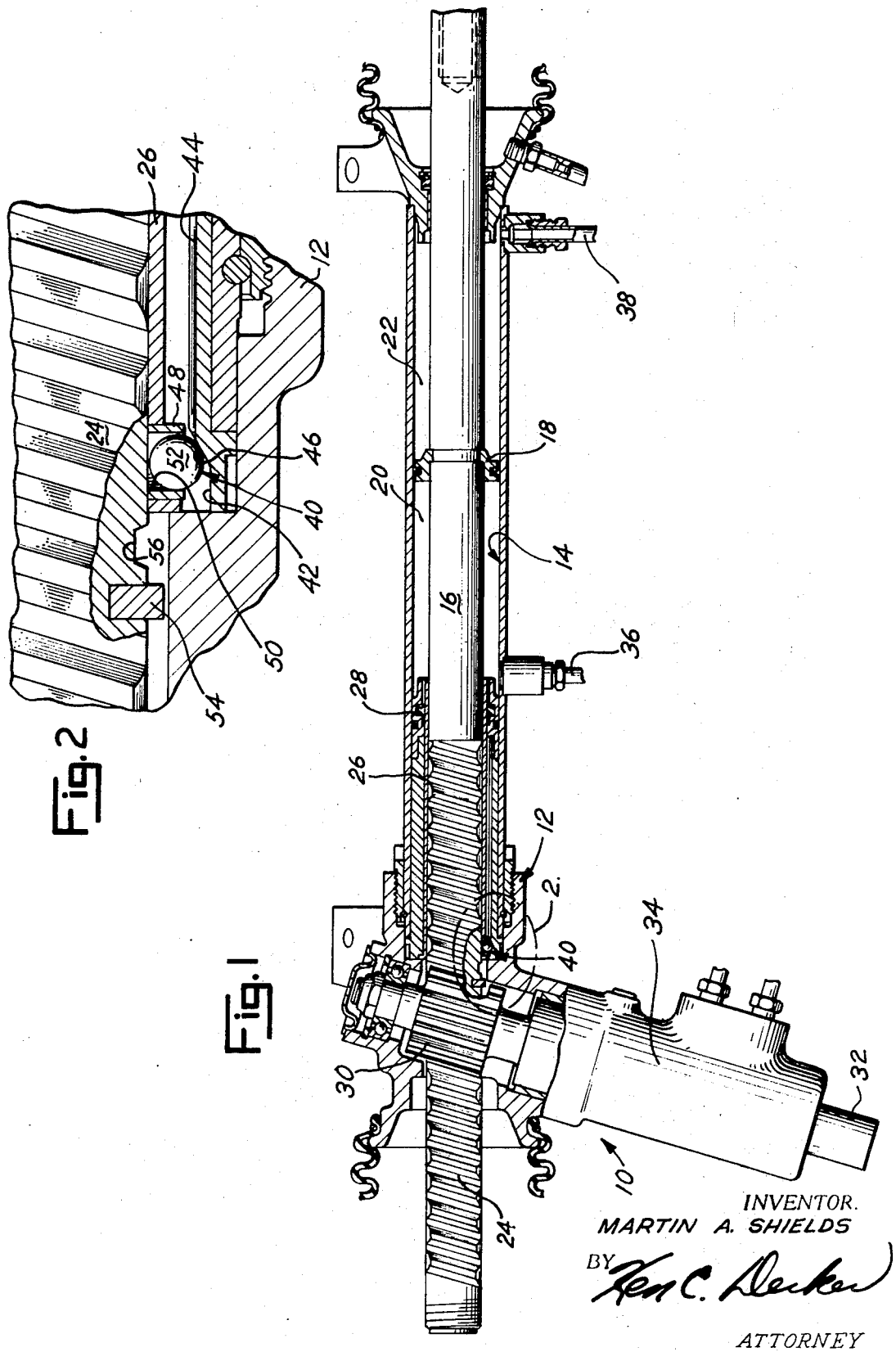

DETENT MECHANISM FOR RACK AND PINION POWER STEERING

BACKGROUND OF THE INVENTION

This invention relates to a detent mechanism for use with a rack and pinion power-steering assembly.

In existing rack and pinion power-steering assemblies, a sleeve shifts with the rack when the vehicle wheels are turned in one direction, but remains stationary when the vehicle wheels are turned in the opposite direction. The sleeve ensures proper sealing of the hydraulic chamber and permits a much shorter unit. Existing power-steering units depend upon hydraulic pressure and seal friction to ensure that the sleeve shifts and returns with the rack. However, the hydraulic pressure used to return the sleeve to its base position must build up until a pressure level is achieved that is sufficient to overcome seal friction. When this occurs, the sleeve is often driven rather abruptly to the base position, often resulting in undesirable noise when the sleeve contacts the housing. It is also important that the sleeve be locked to the housing to keep the sleeve from shifting when the vehicle wheels are turned in the opposite direction.

SUMMARY OF THE INVENTION

Therefore, an important object of my invention is to ensure proper operative cooperation between the sleeve and the rack used in rack and pinion power-steering units.

Another important object of my invention is to ensure that the sleeve shifts and returns with the rack when the vehicle wheels are turned in one direction.

Another important object of my invention is to couple the sleeve to the housing during movement of the rack when the vehicle wheels are turned in the opposite direction.

A further important object of my invention is to eliminate the impact noises inherent in existing rack and pinion power-steering units.

DRAWING DESCRIPTION

FIG. 1 is a transverse cross-sectional view of a rack and pinion power-steering unit made pursuant to the teachings of my present invention; and FIG. 2 is an enlarged cross-sectional view of that portion of FIG. 1 enclosed by the dashed lines.

DETAILED DESCRIPTION

Referring now to the drawings, a rack and pinion power-steering unit generally indicated at 10 includes an elongated housing 12 defining a bore 14 therewithin. An elongated rod 16 is slidably mounted within the bore 14 and has a double-acting pistonhead 18 mounted thereon that slidingly and sealingly engages the wall of the bore 14, dividing the latter into first and second hydraulic chambers 20 and 22. The end of the rod 16 projects from one end of the housing 12 and is operably connected to the right front wheel of the vehicle (not shown). A toothed rack 24 extends from the other end of the rod 14. One end of the rack 24 extends from the other end of the housing 12 and is operably connected to the left front wheel of the vehicle (not shown). A portion of the rack 24 is slidably received within a sleeve 26 which is slidably mounted within the housing 12. An appropriate sealing mechanism 28 is disposed between the sleeve 24 and the wall of the bore 14 to define one end of the hydraulic chamber 20.

A pinion 30 is rotatably supported by the housing 12 in driving engagement with the rack 24. The pinion 30 is rotated by a steering shaft 32 that extends into the operator's compartment. The usual steering wheel (not shown) is also mounted on the steering shaft for rotating the latter. The steering shaft 32 is also arranged to operate a rotary hydraulic valve 34 that selectively admits pressurized fluid into one of the chambers 20 or 22 through the corresponding inlet ports 36 or 38 depending upon the direction that the steering shaft 32 is rotated. The rotary valve 34 may be of any conventional design which is well known to those skilled in the art.

The sleeve 26 is provided so that the sealing mechanism 28 will have a smooth surface to seal against as the rack 24 is shifted to the right viewing FIG. 1. To ensure that the device functions properly, the sleeve must shift with the rack when the latter is shifted from the base position illustrated in the drawings to the right during a left-hand turn. On the other hand, the rack must move relative to the sleeve when the rack shifts to the left viewing the figures to accomplish a right-hand turn. The detent mechanism 40 ensures proper operation of the sleeve 26.

Detent mechanism 40 includes a recess 42 provided in the wall of the bore 14, and an axial groove 44 extends from the recess 42. The depth of the groove 44 is substantially less than the depth of the recess 42 so a ramp 46 is provided that interconnects the recess 42 and the groove 46. A ball guide 48 is secured to the outer surface of the sleeve 26, and an opening 50 extends through the guide 48 and the sleeve 26. A force transmitting element or sphere 52 is normally disposed in the recess 42. The diameter of the sphere 52 is greater than the depth of the recess 42, so therefore the latter projects into the opening 50. An abutment 54 projects from the rack 24 for engagement with the end of the sleeve 26 for shifting the latter. A recess 56 is also provided in the rack 24 and is spaced from the abutment 54 a distance so that when the abutment 54 engages the end of the sleeve 26, the recess 56 is disposed directly over the opening 50 in the sleeve 26.

MODE OF OPERATION

Assuming that the vehicle operator desires to make a left-hand turn, the vehicle operator turns the steering wheel to rotate the steering shaft 32 in a counterclockwise direction. Due to the engagement of the pinion 30 with the rack 24, the latter will be urged to the right viewing the figures. At the same time, rotation of the steering shaft 32 opens the rotary valve 34 to admit high-pressure fluid into the chamber 20 where it acts upon the left face of the piston 18, thereby urging the rod 16 and rack 24 secured thereto to the right (viewing the figures) to provide a power assist to the vehicle operator. As the rack shifts to the right (viewing the figures), the abutment 54 on the rack engages the end of the sleeve 26 to exert a force tending to shift the sleeve 26 to the right. At the same time, the recess 56 is positioned over the opening 50 in the sleeve 26. As the rack begins to move to the right, the ball guide 48 urges the sphere 52 up the ramp 46 and into the groove 44. Since the diameter of the sphere 52 is greater than the distance between the bottom of the groove 44 and the inner surface of the sleeve 26, the sphere 52 projects into the recess 56 of the rack when the sphere 52 is disposed in the groove 44. Therefore, as the rack 24 shifts, the side of the recess 56 engages the sphere 52 as does the wall of the opening 50. The sphere 52 therefore couples the sleeve with the rack. As the rack continues the move to the right, the sphere 52 slides in the groove 44 to permit movement of the sleeve 26 with the rack 24 as the latter moves.

When the operator has completed the left turn, the rack is moved toward the base position. Due to the engagement of the sphere 52 with the recess 56 and with the opening 50, movement of the sleeve to the left (viewing the figures) with the rack is assured. When the rack reaches the base or neutral position, the sphere 52 falls down the ramp 46 into the recess 42, thereby disengaging from the recess 56 to permit the rack 24 to move from the base position to the left viewing the figures relative to the sleeve 26. However, since the diameter of the sphere 52 is greater than the depth of the recess 42, the sphere projects into the opening 50, thereby locking the shaft against movement relative to the bore in any direction except when moved to the right by the rack. Engagement of the sphere 52 with the opening 50 also insures proper alignment of the sphere with the opening so that when the rack is again shifted to the right the sphere may be shifted as described above.

If the vehicle operator desires to make a right-hand turn, the steering shaft 32 is rotated in a clockwise direction to urge the rack 24 to the left, thereby turning the vehicle wheels to the right. As the rack is shifted to the left from the base position, the rack moves relative to the sleeve, which is locked in place in the bore 14 by the sphere 52. As the steering shaft is rotated in a clockwise direction, the rotary valve is opened to admit high-pressure fluid into the chamber 22, where it acts on the right face of the pistonhead 18 to provide a power assist to the vehicle operator.

I claim:
1. In a power-steering mechanism:
a housing defining a bore therewithin:
a double-acting piston slidable in said bore defining first and second chambers between opposite sides of the piston and corresponding ends of the bore;
an elongated rack movable with said piston;
a rotatable pinion meshing with said rack for concomitantly moving the latter and said piston in the same direction with reference to a base position;
means for rotating said pinion;
means for selectively admitting pressurized fluid into said chambers upon rotation of said pinion to act against said piston to assist movement of said rack;
a sleeve coaxial with said rack and movable with the latter when the rack is moved in one direction with reference to said base position; and
coupling means releasably joining said sleeve to said rack during movement of the latter in said one direction and during return of the rack to said base position after movement in said one direction.

2. The invention of claim 1:
said coupling means locking said sleeve against movement relative to the housing when the rack is moved in said other direction.

3. The invention of claim 1:
said coupling means including an opening in said sleeve, a force-transmitting element in said opening and means on said rack for engaging said force-transmitting elements to thereby couple the sleeve to the rack.

4. The invention of claim 3; and
the wall of said bore being provided with an axially extending groove, a recess, and a ramp interconnecting the recess and the groove;
said force-transmitting element being forced up said ramp and into said groove upon movement of the rack from said base position in said one direction.

5. The invention of claim 3:
said force-transmitting element being a sphere.

6. The invention of claim 5:
said engaging means being a recess in said rack adapted to receive said force-transmitting element;
said force-transmitting element being forced through the opening in the sleeve into the recess in the rack upon movement of the latter in said one direction.

7. The invention of claim 5:
the wall of said bore having a recess;
said force-transmitting element being disposed in said recess when the rack is disposed in said bore position or moved in said other direction;
the depth of the recess in the bore being less than the diameter of the force-transmitting element whereby the latter projects from the last-named recess into the recess in the sleeve thereby locking the sleeve against movement relative to the bore.

8. The invention of claim 7:
the wall of said bore being provided with a groove extending axially from the recess in the bore and a ramp interconnecting the recess and the groove;
the depth of the groove being substantially less than the depth of the recess;
said force-transmitting element being forced up said ramp and into said groove upon movement of the rack from said base position in said one direction.

9. The invention of claim 8; and
abutment means projecting from said rack adapted to engage the sleeve upon movement of the rack away from the base position in said one direction;
said engaging means being a recess in said rack positioned to overlie the recess in the sleeve when the abutment means engages the latter;
said force-transmitting element having a diameter greater than the bottom of the groove and the inner surface of the sleeve whereby the force-transmitting element extends into the recess in the rack to couple the sleeve to the rack for movement therewith.

* * * * *